United States Patent
Tarlton et al.

[11] Patent Number: 6,142,708
[45] Date of Patent: Nov. 7, 2000

[54] ROTATING PORCH FOR SUBSEA BRANCH AND TERMINATION PIPELINE CONNECTIONS

[75] Inventors: Oran D. Tarlton, League City; Brian L. Bauers; Bart H. Heijermans, both of Houston; Henry Hang-Sun Chang, Spring, all of Tex.

[73] Assignees: Oil States Industries Inc., Arlington, Tex.; Pegasus International, Inc., Houston, Tex.

[21] Appl. No.: 09/314,736

[22] Filed: May 19, 1999

[51] Int. Cl.⁷ .................................................. F16L 1/12
[52] U.S. Cl. ...................... 405/170; 405/169; 166/341; 285/24; 285/184; 285/920
[58] Field of Search ................... 405/169, 170; 166/344, 347, 341, 342, 343; 285/24, 184, 920

[56] References Cited

U.S. PATENT DOCUMENTS

| | | |
|---|---|---|
| Re. 31,265 | 6/1983 | Sinclair et al. ............... 405/169 |
| 973,794 | 10/1910 | Lightcap . |
| 3,524,326 | 8/1970 | Craste ......................... 61/723 |
| 3,746,372 | 7/1973 | Hynes et al. ................. 285/95 |
| 3,782,458 | 1/1974 | Slack ........................... 166/0.5 |
| 3,841,357 | 10/1974 | Heijst ........................... 138/120 |
| 4,031,919 | 6/1977 | Ortloff et al. ............... 137/799 |
| 4,036,295 | 7/1977 | Kirkland et al. ........... 166/342 |
| 4,065,822 | 1/1978 | Wilbourn ........................... 9/8 |
| 4,085,781 | 4/1978 | Serpas et al. ................. 141/1 |
| 4,086,778 | 5/1978 | Latham et al. ............... 166/343 |
| 4,100,752 | 7/1978 | Tucker ........................... 61/86 |
| 4,139,221 | 2/1979 | Shotbolt ........................ 285/18 |
| 4,161,367 | 7/1979 | Cuiper et al. ................ 405/169 |
| 4,371,291 | 2/1983 | Morrill et al. ............... 405/169 |
| 4,382,717 | 5/1983 | Morrill ......................... 405/169 |
| 4,472,080 | 9/1984 | Lawson ........................ 405/169 |
| 4,472,081 | 9/1984 | Lawson ........................ 405/169 |
| 4,477,105 | 10/1984 | Wittman et al. ............. 285/18 |
| 4,641,998 | 2/1987 | Baugh ........................... 405/169 |
| 4,661,016 | 4/1987 | Baugh et al. ................ 405/169 |
| 4,661,017 | 4/1987 | Wood et al. ................. 405/169 |
| 4,725,080 | 2/1988 | Josefiak et al. ............. 285/24 |
| 4,784,523 | 11/1988 | Louis et al. ................. 405/169 |
| 4,820,083 | 4/1989 | Hall ............................. 405/169 |
| 4,842,075 | 6/1989 | Kalvenes et al. ........... 166/341 |
| 4,906,137 | 3/1990 | Maloberti et al. .......... 405/195 |

(List continued on next page.)

FOREIGN PATENT DOCUMENTS

| | | | |
|---|---|---|---|
| 2 009 093A | 6/1979 | United Kingdom | B67D 5/60 |
| 2 097 358A | 11/1982 | United Kingdom | B67D 5/60 |
| 2 148 842A | 6/1985 | United Kingdom . | |

OTHER PUBLICATIONS

Floating Productin, "Designing Flexible Risers For Deepwater Applications", p. 34, 36 2212 Offshore Incorp. The Oilman 52 (1992) Feb., No. 2., Tulsa OK.

GPS–10–01 "General Product Specification For Piggable "Y" Fittings", pp. 1–6, Hydro Tech Systems, Inc., Engineered Pipeline Products, Jul. 1997, Houston, TX.

Advanced Production and Loading, APL AS, OTC 7912, Houston, TX May 1–4, 1995.

*Primary Examiner*—James A. Lisehora
*Assistant Examiner*—Alexandra K. Pechhold
*Attorney, Agent, or Firm*—Howrey Simon Arnold & White, LLP

[57] ABSTRACT

A pipeline connection assembly includes a landing platform and rotary or swivel connection hub which may be attached to a pipeline branch, termination, or manifold. The landing platform is mounted so that it may be rotated about the connection hub. This permits the installation of a subsea connection on a near level platform and allows the pipeline to be laid subsea with greater roll angles than would be acceptable otherwise. Orientation of the landing porch horizontally removes the requirement to manufacture the connection jumper to compensate for the roll differences in the hubs. In the preferred construction, the elevation of the platform can be adjusted by a remotely operated vehicle (ROV) and locked into place once the adjustment is completed.

23 Claims, 11 Drawing Sheets

U.S. PATENT DOCUMENTS

| | | | |
|---|---|---|---|
| 4,943,188 | 7/1990 | Peppel | 405/224 |
| 4,971,307 | 11/1990 | Killerud et al. | 285/155 |
| 5,018,903 | 5/1991 | O'Donnell et al. | 405/170 |
| 5,044,672 | 9/1991 | Skeels et al. | 285/98 |
| 5,314,024 | 5/1994 | Rodgers et al. | 166/347 |
| 5,320,175 | 6/1994 | Ritter et al. | 166/344 |
| 5,564,957 | 10/1996 | Breivik et al. | 441/5 |
| 5,615,977 | 4/1997 | Moses et al. | 405/195.1 |
| 5,730,551 | 3/1998 | Skeels et al. | 405/170 |
| 5,807,027 | 9/1998 | Ostergaard | 405/170 |
| 5,857,715 | 1/1999 | Gray et al. | 285/131.1 |

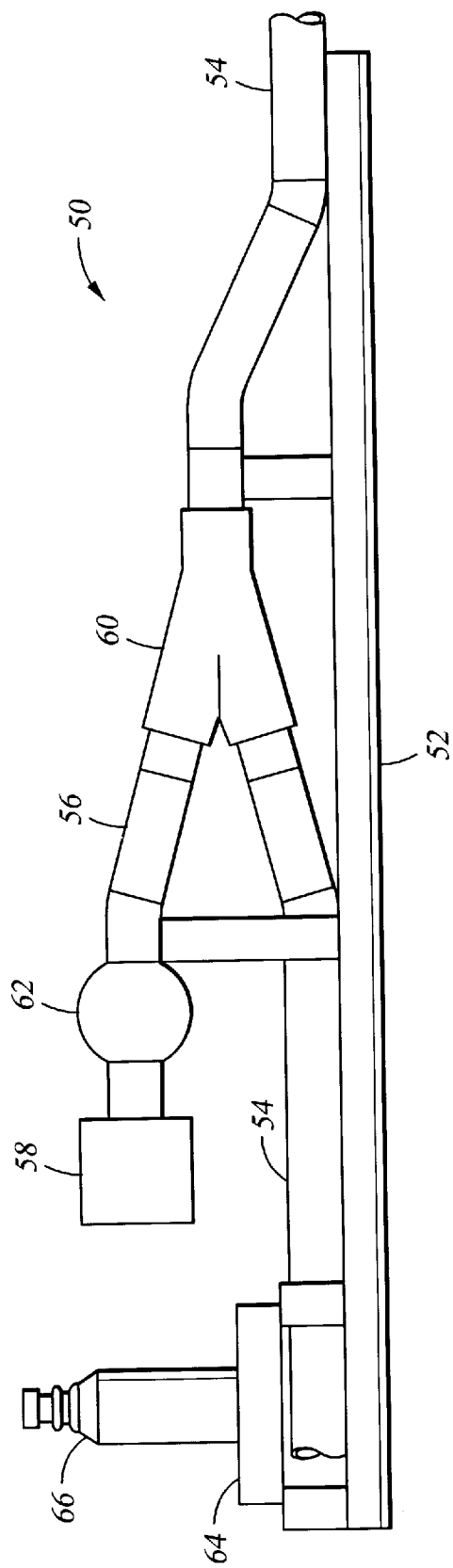
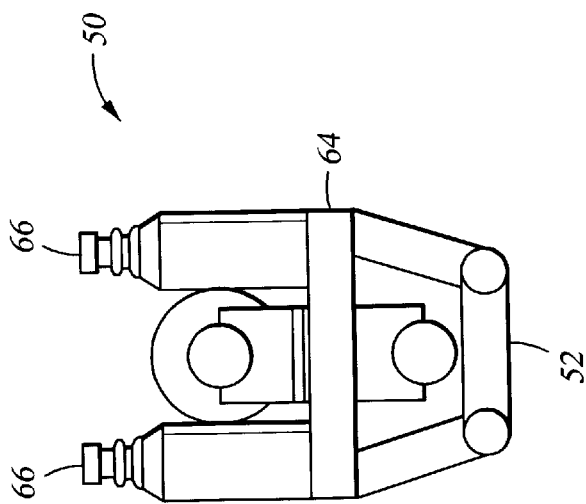
Fig. 3a
(PRIOR ART)
Fig. 3b
(PRIOR ART)

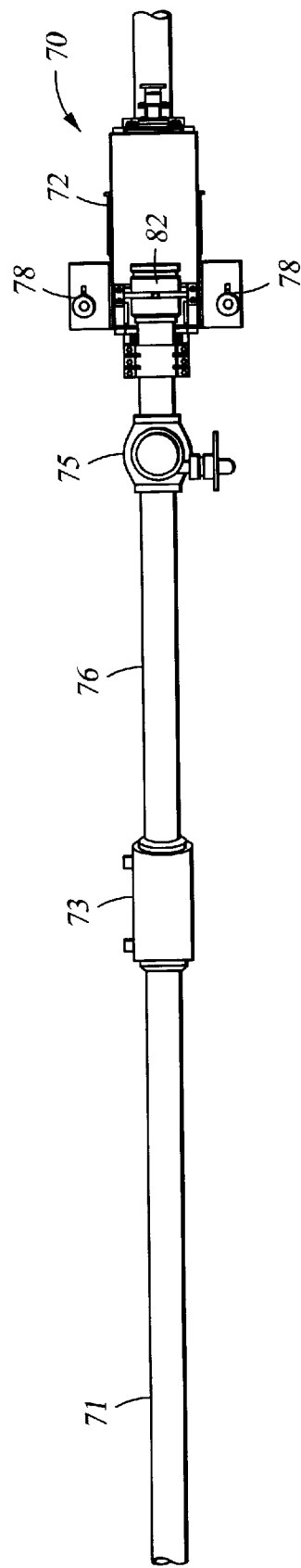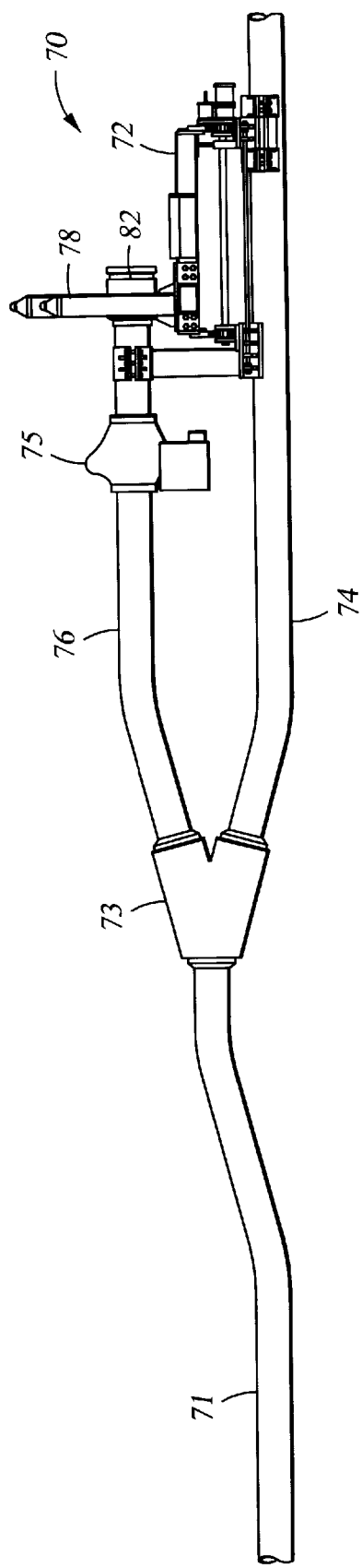
Fig. 4a
Fig. 4b

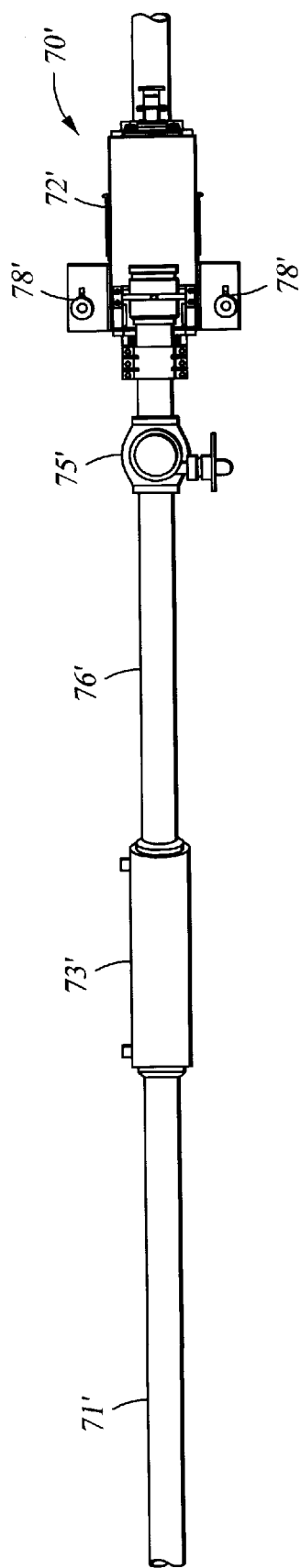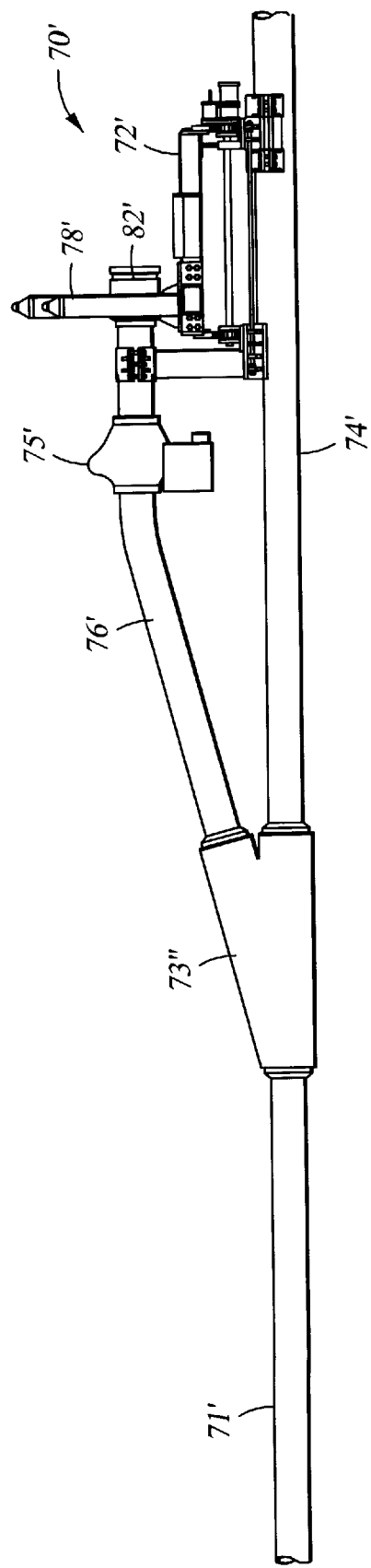
Fig. 5a
Fig. 5b

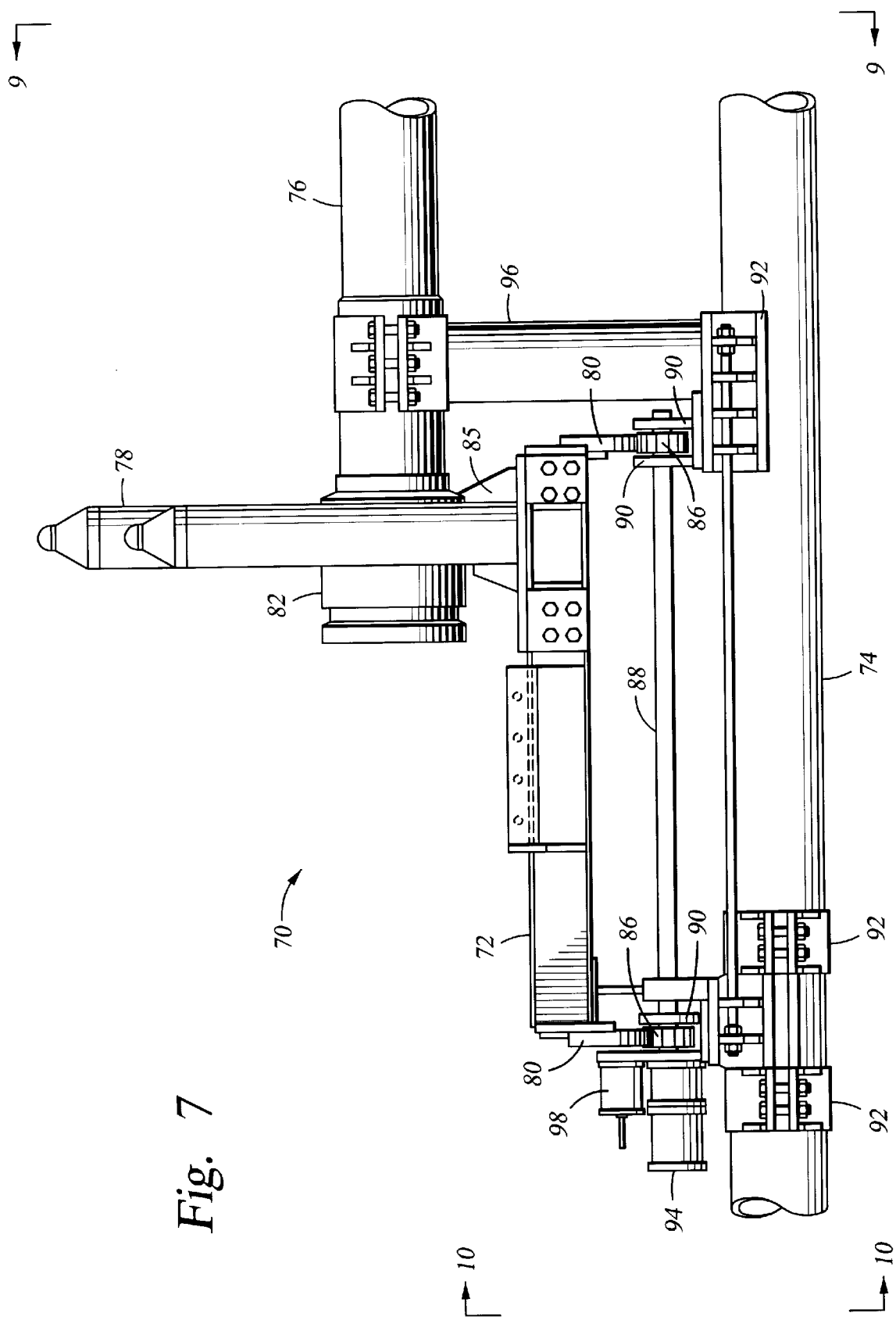

ROTATING PORCH FOR SUBSEA BRANCH AND TERMINATION PIPELINE CONNECTIONS

BACKGROUND OF THE INVENTION

1. Field of the Invention

The present invention relates generally to subsea pipeline connections and more particularly to subsea branch and termination connection points where a subsea connection jumper would be used.

2. Background Art

A marine pipeline system may consist of many branch or tributary pipelines, which feed the product into a common main pipeline or trunkline. The pipeline system may have many mid-line connection points. The mid-line connection points have connection hubs where connections may be made to join the pipeline, or pipelines, to production infrastructure. For subsea marine pipelines this is frequently done with connection jumpers which span between two end points to complete a connection. The mid-line connection points also have pipeline end sleds or manifolds to assist in connecting a jumper to the connection hub of the mid-line connection point.

A common type of pipeline end sled has a platform or other support structure for landing a connection jumper so that the connection jumper can be mated to the connection hub of the mid-line connection point. The pipeline end sled may also have guideposts for aligning the landing of the jumper connector. The guideposts also act as an anchor for the forces required to pull in a jumper to mate with the connection hub of the mid-line connection point.

When mating a connection jumper to a mid-line connection point, the connection jumper must be specially manufactured and installed to connect the pipeline to infrastructure or another pipeline. The connection jumper must be manufactured such that it spans between the connection hubs and mimics the geometrical orientation of the two hubs. When the connection jumper is manufactured it must be positioned or "rigged" precisely so that it can be lowered to the seafloor and landed on the pipeline end sled or manifold so that a connection can be made.

The process of manufacturing and landing a connection jumper is more difficult if the pipeline end sleds and guideposts are not in the desired vertical position. When a pipeline is installed subsea, the process inherently introduces torsion into the pipeline. The pipeline and any associated connection points may then rotate to alleviate all or part of this torsion. When the pipeline end sled is located along the pipeline, this pipe rotation may cause the platform or other support structure of the sled to be oriented up to plus or minus 25 degrees from the desired vertical position. Accordingly, a future tie-in to a rotated pipeline sled will have to overcome any roll found in the platform or other support structure of the pipeline sled.

The present state of the art requires that the connection jumper be manufactured to mimic the relative distance, elevation, roll, pitch, and yaw between the hubs. Thus, a need exists for less restrictive manufacture of the connection jumper and less difficulty landing the connection jumper.

Moreover, current state of the art requires pipeline installation contractors to land the pipeline and mid-line connection points (including the pipeline end sleds) on the sea floor within a particular roll angle window relative to horizontal. In order to accomplish this task, great care and time are required while using buoyancy modules to counteract the tendency of the pipe to roll as it is laid. Thus, a need also exists for less restrictive measures for laying pipeline to the sea floor.

SUMMARY OF INVENTION

The present invention addresses the above needs. In accordance with one aspect of the invention, a pipeline connection assembly includes a connection hub and a landing platform. The connection hub is adapted for mounting to a fluid containing structure such as a manifold or an end portion of a pipeline. The landing platform is rotatably mounted with respect to the connection hub for adjustment of inclination of the landing platform, which is adapted for receiving a connection jumper.

The landing platform may have guideposts to assist in aligning and pulling in the connection jumper for mating of the connection jumper to the connection hub. The connection hub, for example, is a rotary or swivel connection hub that makes a sealed connection with the connection jumper once the connection jumper is mated to the connection hub.

The pipeline connection assembly may include a rotational adjustment mechanism for rotating the landing platform with respect to the connection hub, and a locking mechanism for preventing rotation of the landing platform about the rotary connection hub once the desired rotational adjustment is made.

In a preferred embodiment, the rotational adjustment mechanism includes a rack and pinion assembly. At least one rack is attached to the bottom of the landing platform, and the rack engages a pinion that is rotatably mounted to a substantially stationary support structure. The support structure, for example, is mounted to the pipeline, and it may include a frame that rests on the seabed.

In accordance with another aspect of the invention, there is provided a method for connecting a connection jumper to a connection assembly. The connection assembly includes a connection hub and a landing platform. The connection hub is mounted to an end portion of a pipeline. The landing platform is rotatably mounted to the connection hub for adjustment of inclination of the landing platform, which is adapted for receiving the connection jumper. The method includes rotating the platform to a substantially horizontal inclination, landing the connection jumper on the landing platform, and mating the connection jumper to the connection hub. The method may also include locking the platform into a generally horizontal plane. The method may include aligning the connection jumper onto guideposts of the landing platform, and applying a tension force between the guideposts and the connection jumper to pull the connection jumper into mating engagement with the connection hub.

The pipeline connection assembly may be installed with and be an integral part of a branch pipeline or a pipeline end sled. The pipeline connection assembly may allow a connection jumper to be landed on the branch connection or pipeline termination even if there is up to plus or minus 25° of roll between the connection hub and the connection jumper. The inclination of the landing platform may be adjusted by a diver or a Remotely Operated Vehicle (ROV). The diver or ROV may rotate the landing platform to horizontal using a standard subsea intervention torque tool. An inclinometer mounted on the landing platform may provide the reference for a horizontal datum. In one embodiment, the rotating porch can be rotated by plus or minus 25° and locked in 1° increments. Rotating the landing platform of the rotating porch to a horizontal plane may simplify the manufacture of the jumper by reducing the degrees of freedom to which it must be manufactured from three to two.

BRIEF DESCRIPTION OF THE DRAWINGS

The invention may be better understood by reference to one or more of the following drawings in combination with the detailed description of specific embodiments presented herein.

FIGS. 3a and 3b are elevation and end views of a prior art mid-line connection point having a vertical pipeline branch arrangement that ends at a horizontal hub.

FIGS. 4a and 4b are elevation and top views of a rotating porch according to the present invention connected to a pipeline by a symmetrical "Y" connection.

FIGS. 5a and 5b are elevation and top views of a rotating porch according to the present invention connected to a pipeline by an asymmetrical "Y" connection.

FIG. 7 is an elevation view of a rotating porch in accordance with the present invention.

Figure 1:
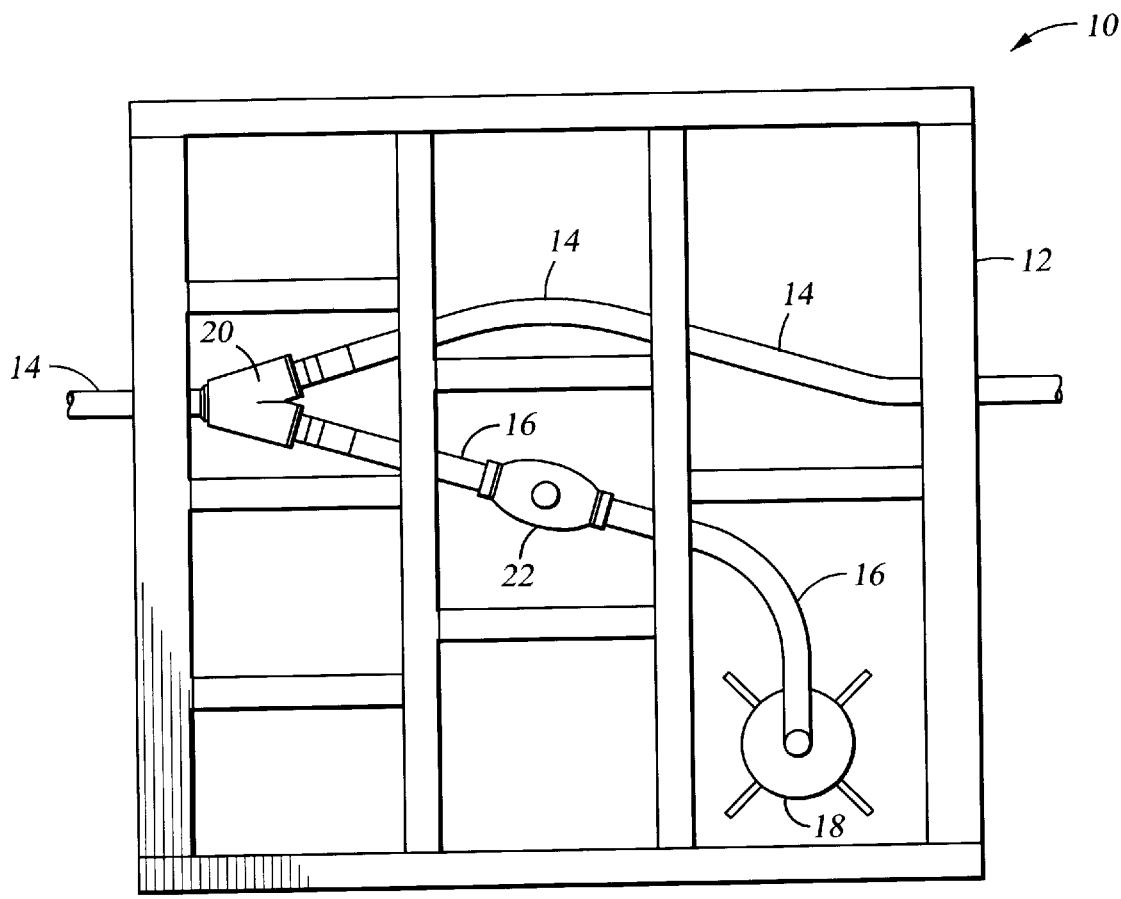
FIG. 1 is a top view of a prior art mid-line connection point having a horizontal tributary branch that ends at a vertical connector hub.

While the invention is susceptible to various modifications and alternative forms, specific embodiments have been shown by way of example in the drawings and will be described in detail herein. However, it should be understood that the intention is not to limit the invention to the particular forms disclosed. Rather, the intention is to cover all modifications, equivalents and alternatives falling within the spirit and scope of the invention as defined by the appended claims.

DESCRIPTION OF ILLUSTRATIVE EMBODIMENTS

Referring now to FIG. 1, a prior art mid-line connection point assembly 10 includes a base structure 12, a pipeline 14, a horizontal tributary branch 16, and a vertical hub 18. One end of the horizontal tributary branch 16 is connected to the pipeline 14 by a piggable "Y" connector 20. The other end of the horizontal tributary 16 is connected to the vertical hub 18. The vertical hub 18 includes an upward looking, vertical connection structure. A ball valve 22 is provided to selectively isolate the vertical hub 18 from the pipeline 14. The vertical hub 18 may provide a connection to a jumper. When connecting a jumper to the vertical hub 18, the mating connector for the jumper is installed vertically. Thus, care must be taken in manufacturing a jumper. Since vertical hub 18 is upright and fixed in one location, one must consider roll, pitch, distance, and elevation when manufacturing the jumper.

Figure 2:
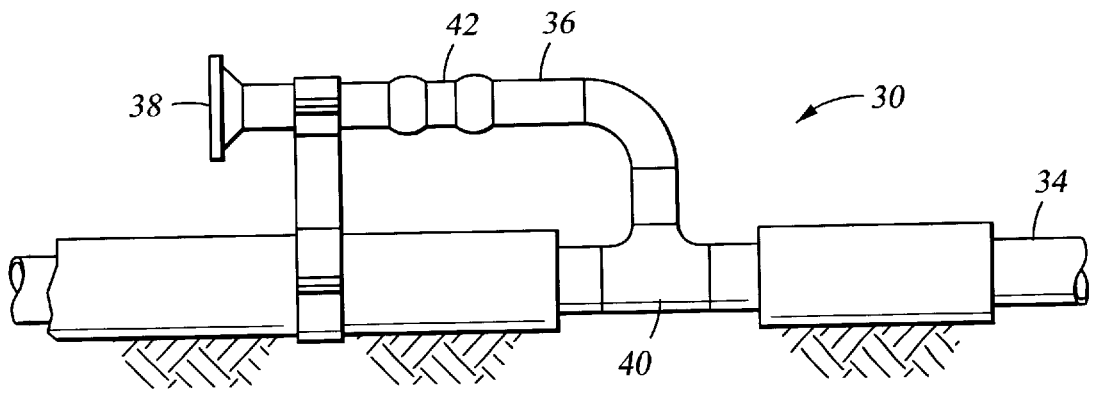
FIG. 2 is an elevation view of a prior art mid-line connection point having a vertical "T" tributary branch that ends at a conventional connection flange.

FIG. 2 illustrates another prior art mid-line connection point assembly 30. The connection point assembly 30 includes a pipeline 34, a vertical tributary branch 36, and a standard flange 38 for diver make-up of a connection to a jumper. One end of the vertical tributary branch 36 is connected to the pipeline 34 by a "T" fitting or connector 40. The other end of the vertical tributary 36 is connected to the horizontal connector hub 38. A ball valve 42 is provided to selectively isolate the standard flange 38 from the pipeline 34.

FIGS. 3a and 3b illustrate another prior art connection point assembly 50. The connection point assembly 50 includes a base structure 52, a pipeline 54, a vertical tributary branch 56, a horizontal connector hub 58, and a support sled 64. A piggable "Y" connector 60 connects the vertical tributary branch 56 to the pipeline 54. A ball valve 62 selectively isolates the horizontal connector hub 58 from the pipeline 54. The horizontal connector hub 58 may be used to serve as a connection to a jumper. When connecting a jumper to the horizontal connector hub 58, the mating connector for the jumper must be installed horizontally. A support sled 64 and guideposts 66 may be used to complete the connection to the horizontal connector hub 58. The connection is made by landing a connection jumper over the guideposts 66 and mating the connection jumper of the jumper to the horizontal connector hub 58. The support sled 64 is rigid in the prior art connection point assembly 50 as shown in FIGS. 3a and 3b. Since the support sled 64 is fixed, it is difficult to provide a level surface on which to land a horizontal connector. As described earlier, torque in the pipeline 54 may cause the support sled 64 and guideposts 66 to rotate from their desired horizontal and vertical orientations. Care must be taken in manufacturing a jumper that is to be connected to the horizontal connector hub 58. One must consider roll, pitch, distance, and elevation when manufacturing the jumper. Thus, the pipeline installation contractor must install the pipeline branch connection within tight roll limits.

The present invention is illustrated in FIG. 4a to FIG. 12. These figures illustrate a pipeline connection assembly or rotating porch that is used in various ways to simplify installation of a subsea jumper between a tributary branch or pipeline termination point and production infrastructure.

FIGS. 4a and 4b illustrate a rotating porch 70 in accordance with the invention, as installed on a pipeline 74 and a tributary branch 76. The tributary branch 76 is connected to the pipeline 74 via a connector 73, which joins the pipeline 74 and the tributary branch 76 to a pipeline 71. The connector 73 is shown as a piggable and symmetric "Y" connector, although a "T" connector or other type of connector could be used instead. A valve 75 is provided to selectively isolate the end of the tributary branch 76 from the pipeline 74. The rotating porch 70 includes a landing platform 72 and guide posts 78 which are rotatably mounted to a connection hub 82 for adjustment of inclination of the landing platform.

FIGS. 5a and 5b illustrate an alternative pipeline arrangement in which a piggable asymmetric "Y" connector 73' is used in lieu of a symmetric "Y" connector 73. A rotating porch 70' in accordance with the invention is installed on a pipeline 74' and a tributary branch 76'. The tributary branch 76' is connected to the pipeline 74' via the piggable, asymmetric "Y" connector 73'. A valve 75' is provided to selectively isolate a connection hub 82' at the end of the tributary branch 76' from the pipeline 74'. The rotating porch 70' includes a landing platform 72' and two guide posts 78' which are rotatably mounted to the connection hub 82' for adjustment of inclination of the landing platform.

Figure 6A:
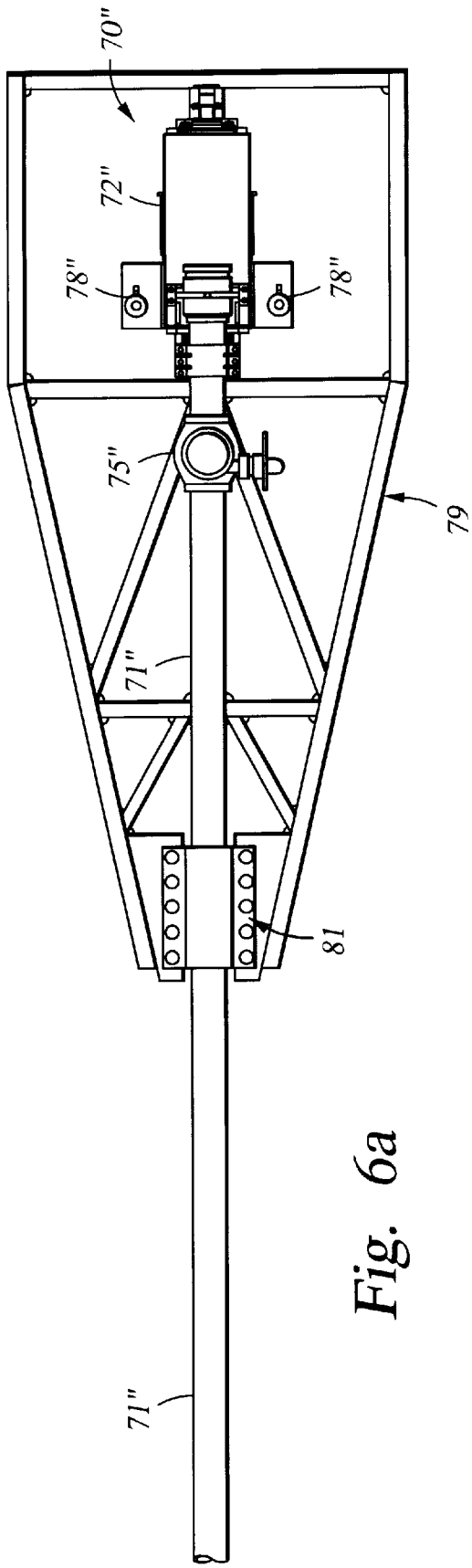
FIGS. 6a and 6b are elevation and top views of a rotating porch according to the present invention mounted on a sled at the termination of a pipeline.
Figure 6B:
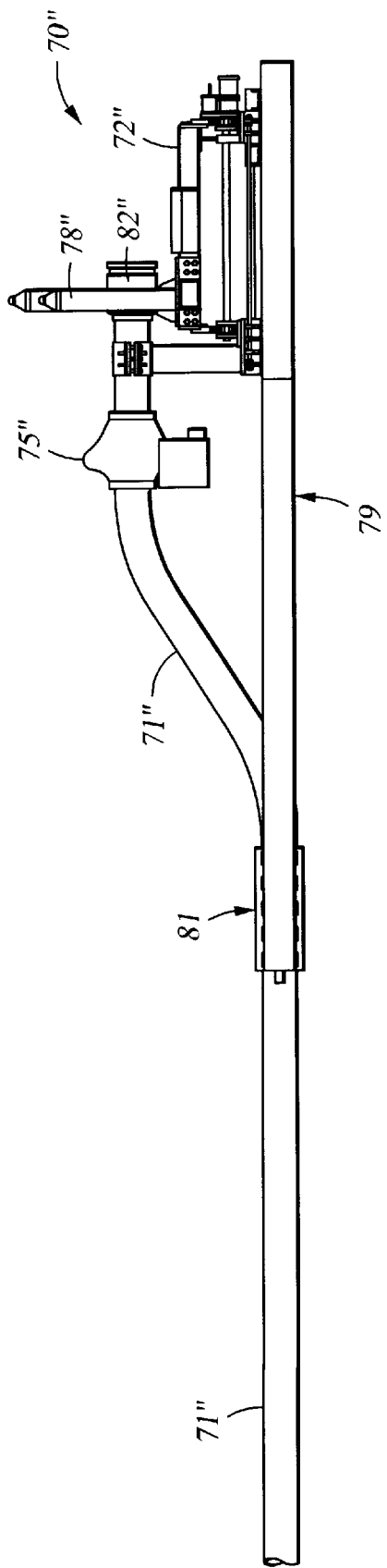

As shown in FIGS. 4a and 4b or 5a and 5b, the rotating porch 70 or 70' can be installed with and as an integral part of the tributary branch 76 or 76'. Alternatively, as shown in FIGS. 6a and 6b, a rotating porch 70" in accordance with the invention is mounted to a pipeline end sled 79. The pipeline end sled 79 is secured by a clamp assembly 81 to a straight section of a pipeline 71". An end portion of the pipeline 71" is connected by an isolation valve 75" to a connection hub 82" of the rotating porch 70". The rotating porch 70" includes a landing platform 72" and two guide posts 78" which are rotatably mounted to the connection hub 82" for adjustment of inclination of the landing platform.

FIG. 7 illustrates a closer view of the rotating porch 70. The rotating porch 70 has a landing platform 72 for receipt or landing of a jumper connector. (The preferred jumper connector is shown and described below with reference to FIG. 12.) The landing platform 72 is wider than the base of the jumper connector and provides a stable platform and some guidance for the jumper connector as it is pulled in to mate with the hub 82 of the tributary branch 76. Guideposts 78 are attached to the landing platform 72. The guideposts 78 provide the initial alignment for the jumper. The guideposts 78 also act as an anchor for the forces required to pull in a jumper.

In a preferred embodiment as shown in FIG. 7, a rack and pinion assembly functions as a rotational adjustment mechanism for rotation of the landing platform 72 and guideposts 78 with respect to the connection hub 82. Other rotational adjustment mechanisms could be used instead, such as a rotary hydraulic actuator, or hydraulic piston-cylinder arrangements. The rotational adjustment mechanism could include ball bearings, wheels or slots. For the preferred rack and pinion assembly, two semi-circular racks 80 are attached to the bottom sides of the landing platform 72. The center of rotation for the landing platform 72 and guideposts 78 is a swivel or rotary connection hub 82. The connection hub 82 is connected to the tributary branch 76. To permit rotation about the connection hub 82, the landing platform 72 is rotatably mounted to the connection hub 82.

The racks 80 are joined to pinions 86 to provide rotation. The pinions 86 are connected together by a rotating shaft 88. The rotating shaft 88 is rotatably mounted by support members 90 that permit rotation of the pinions 86. The support members 90 are attached to the pipeline 74 via clamps 92. The support members 90 may also be attached to a pipeline end sled or other support structure, for example as illustrated in FIGS. 6a and 6b.

Figure 8:
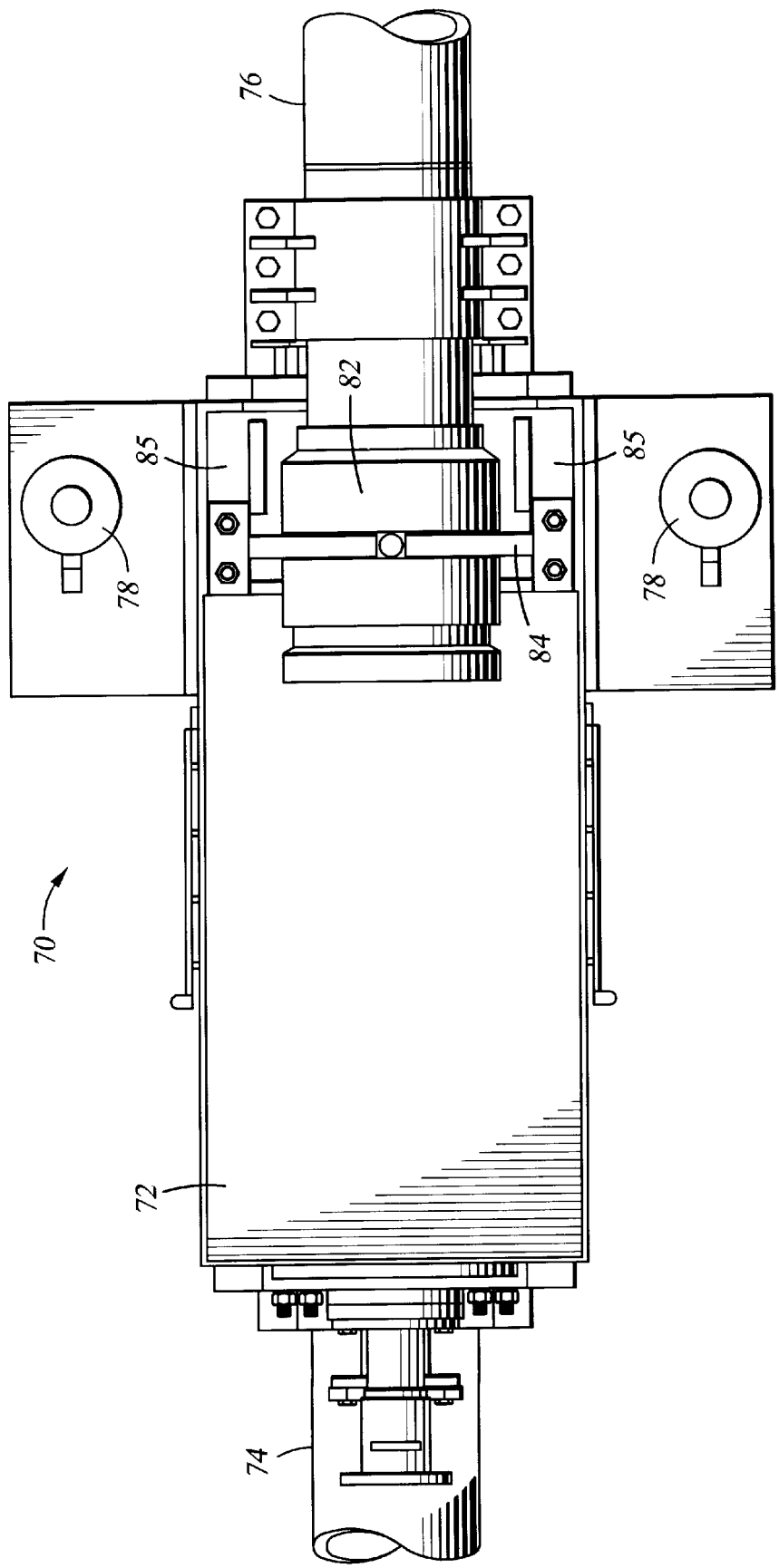
FIG. 8 is top view of the rotating porch shown in FIG. 7.
Figure 9:
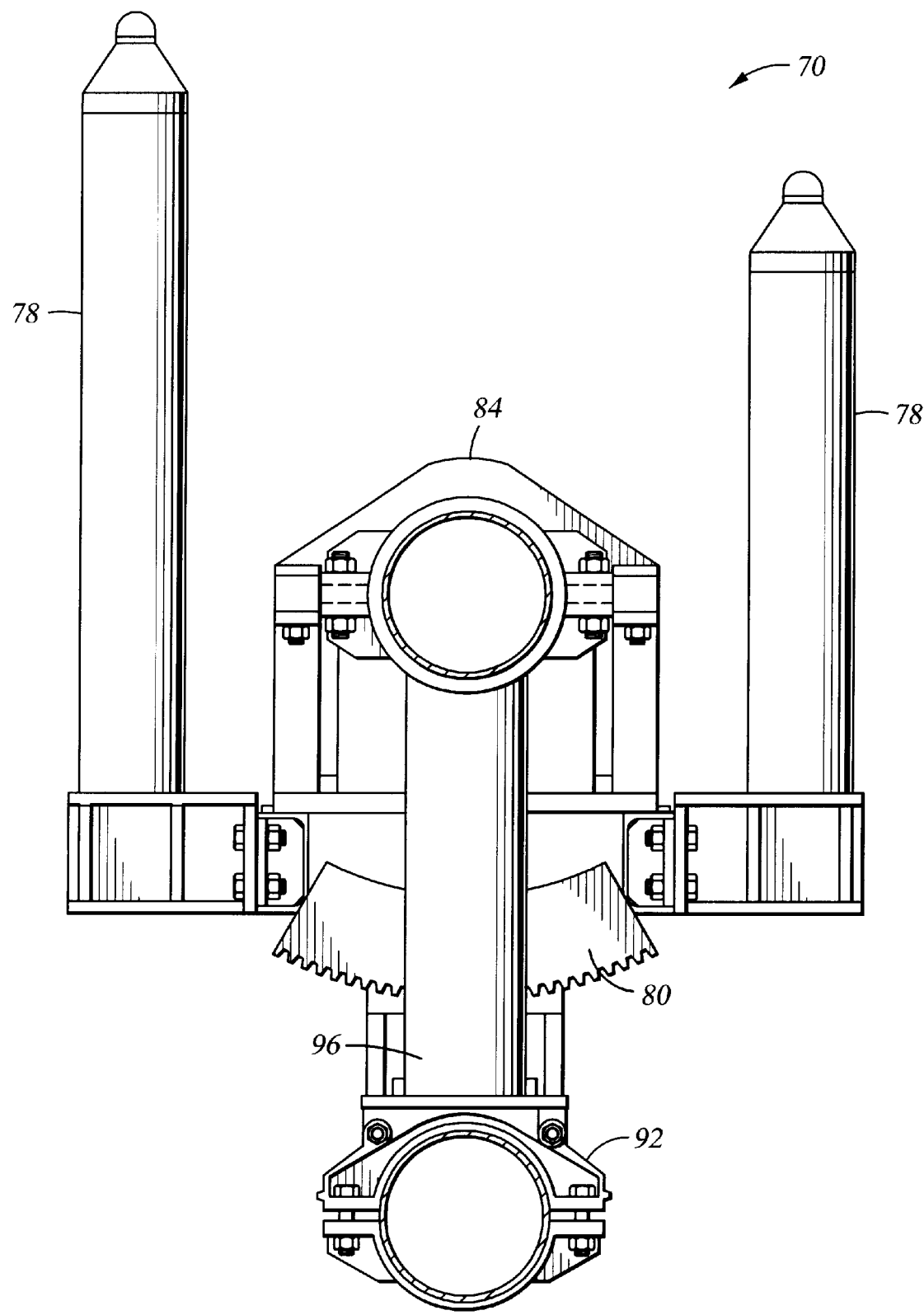
FIG. 9 is an end view of the rotating porch shown in FIG. 7.

FIGS. 8 and 9 are top and end views of the rotating porch 70. A brace 96 provides support between the tributary branch 76 and the pipeline 74. A support brace 84 provides attachment between the connection hub 82 and the landing platform 72. The support brace 84 in effect clamps the connection hub 82 to a lower mounting member 85 that is welded to the landing platform 72. However, there is sufficient clearance between the support brace 84, the connection hub 82, and the lower supporting member 85 to permit relatively free rotation of the landing platform 72 with respect to the connection hub 82. As shown in the exploded view of FIG. 11, a semicircular portion of the support brace 84 and a semicircular portion of the lower mounting member 85 become entrained within an annular groove 87 machined in the connection hub 82.

Figure 10:
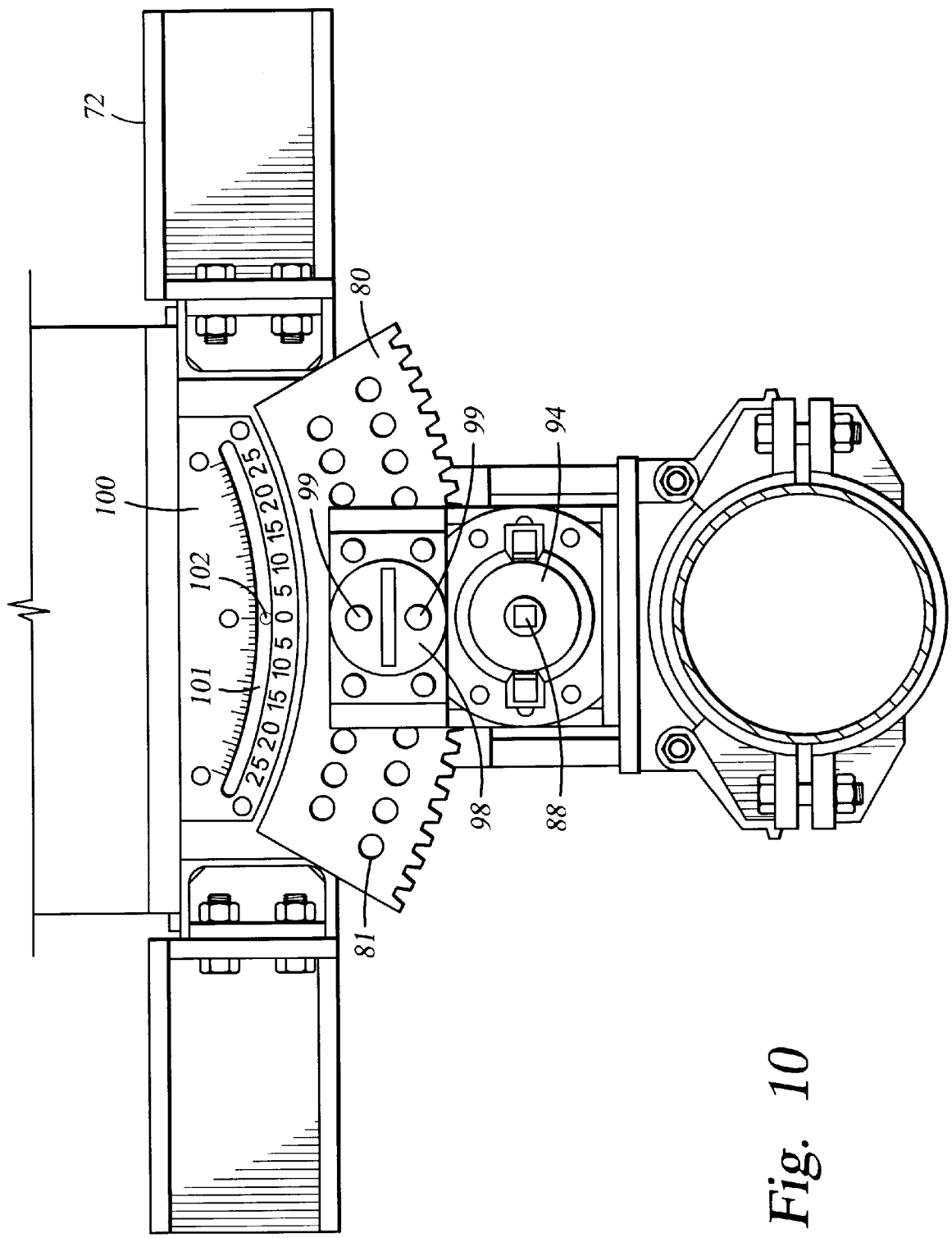
FIG. 10 is an end view of the rotating porch of FIG. 7 illustrating a rack and pinion assembly of a rotational adjuster, and a locking unit.
Figure 11:
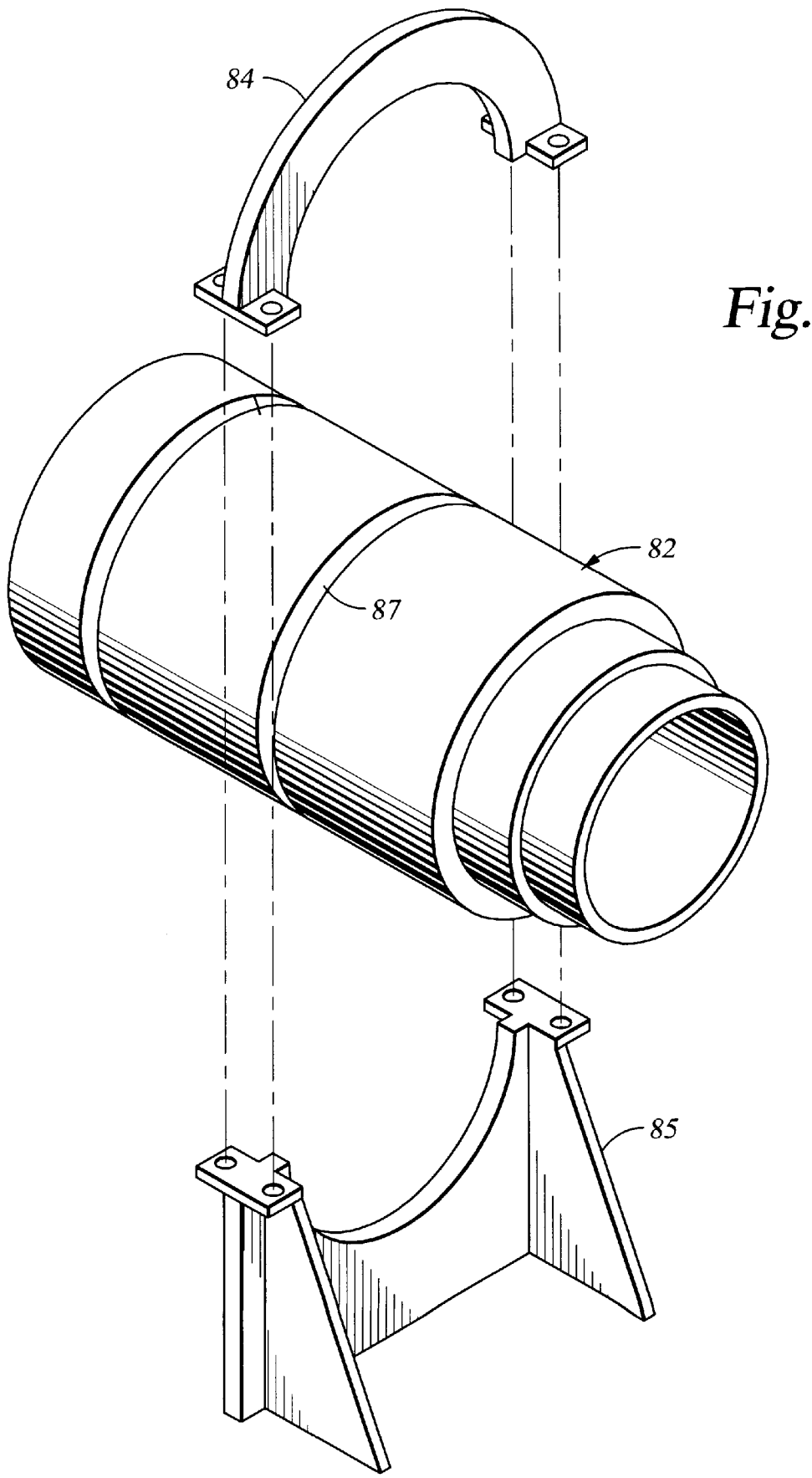
FIG. 11 is an exploded view of a bearing assembly used for rotatably mounting a landing platform of the rotating porch to a connection hub.

FIG. 10 illustrates a standard API torque bucket 94 for coupling to a standard subsea intervention torque tool of an ROV to permit actuation of the rotational adjustment mechanism by rotation of the shaft 88. Rotation of the shaft 88 rotates the pinions 86 which in turn causes the racks 80 to rotate resulting in the rotation of the landing platform 72 and the guideposts 78 about the connection hub 82.

FIG. 10 further illustrates a locking unit 98 of the rotating porch 70. The locking unit 98 enables the landing platform 72 and guideposts 78 to be locked into place after reaching a desired position. In the preferred embodiment, the rack 80 has a plurality of holes 81. The locking unit 98 is rigidly attached to the pipeline 74 or other rigid support structure. This can be done by rigidly attaching the locking unit 98 to clamps 92. The locking unit 98 has pins 99 that can be inserted into the holes 81 of the rack 80. This enables the rack 80 to be locked into place and prevents the rotation of the landing platform 72 and guideposts 78. To allow rotation of the landing platform 72 and guideposts 78, the pins of 99 of the locking unit 98 are removed from the holes 81 of the rack 80.

As shown in FIG. 10, an inclinometer 100 may be mounted on the landing platform 72 to provide the reference for a horizontal datum. The inclinometer 100 includes an arcuate glass tube 101 filled with fluid such as water and a ball bearing 102 that rests at the lowest point in the glass tube. In one embodiment, the rotating porch 70 can be rotated by plus or minus 25° and locked in 1° increments. The rotating porch 70 thus allows a jumper connection to be landed on the branch connection even with a large degree (plus or minus 25°) of roll.

The design objective for the rotating porch 70 is to provide a method of correction for installation misalignment of the pipeline 74 as it is laid. As described earlier, when a pipeline 74 is installed subsea, the process inherently introduces torsion into the pipeline 74. The pipeline 74 may then rotate to alleviate all or part of this torsion. When a pipeline end sled is located along the pipeline 74, this pipe rotation may cause the sled to be oriented up to plus or minus 25 degrees from the desired vertical position.

When manufacturing and landing a connection jumper, it is often desirable to have the landing platform 72 of the rotating platform 70 in the horizontal plane and, if guideposts 78 exist, to have the guideposts 78 in the vertical position. Having the landing platform 72 of the rotating platform 70 in the horizontal plane simplifies the manufacture of the connection jumper by reducing the degrees of freedom to which it must be manufactured from three to two.

The rotating porch 70 may be adapted so that it may be rotated manually by a diver or by a Remotely Operated Vehicle (ROV). If a ROV is used, the ROV may rotate the landing platform 72 of the rotating porch 70 to horizontal using a standard subsea intervention torque tool. The ROV torque bucket (94 in FIG. 10) is attached to the pinions 86 so that torque provided by the ROV will react through the pinions 86 to the circular racks 80 rotating the landing platform 72 and guideposts 78 about the swivel connection hub 82. Once the landing platform 72 and guideposts 78 have been brought to the vertical position, the ROV may actuate the locking unit 98. The rotating porch 70 is now ready to accept the connection jumper.

Figure 12:
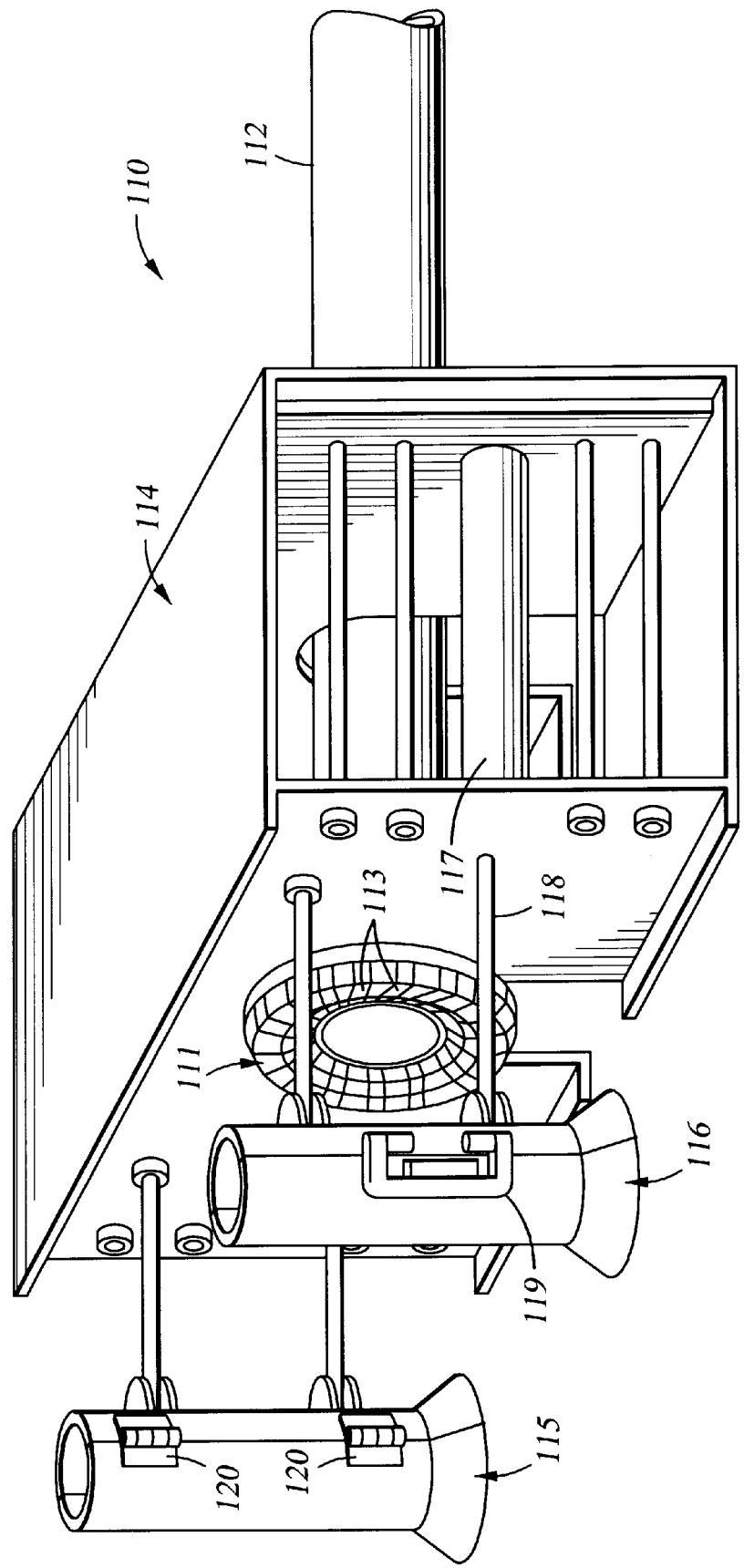
FIG. 12 is a perspective view of a connection jumper showing a female connector terminating a connection jumper, and showing a hydraulic unit that is slipped over the connection jumper and that lands on the landing platform of the rotating porch while engaging guide posts on the landing platform in order to pull the female connector into a mating configuration with the connection hub of the rotating porch.

As shown in FIG. 12, a typical connection jumper 110 includes a rotary or swivel connector 111 mounted on an end portion of a jumper pipeline 112. The connector 111 is a female connector having a circular series of fingers 113 for locking with the connection hub. Also shown in FIG. 12 is a hydraulic mechanism 114 that is slipped over the jumper pipeline 112 and is used for aligning and engaging the connector 111 with the connection hub of a branch or trunk pipeline. The hydraulic mechanism 114 includes a pair of cylindrical split sleeves 115, 116 which are spaced for alignment with guideposts on a landing platform. Once the sleeves are slipped over the guide posts, the hydraulic mechanism 114 is lowered so that it rests upon the landing platform. When the hydraulic mechanism 114 rests upon the landing platform, the connector 111 is in coaxial alignment with the connection hub, and the hydraulic mechanism 114 is actuated to pull the connector 111 into engagement with the connection hub. This is done by pumping hydraulic fluid into a pair of cylinders at opposite sides of the mechanism. A respective piston and cylinder is provided for each of the split sleeves 115, 116. For example, the cylinder 117 has a piston rod 118 for applying a tension force between the split sleeve 116 and the connector 111. Once the connector 111 has mated with the connection hub, the hydraulic mechanism 114 can be lifted off the jumper pipeline 112 without disengaging the connector 111 from the connection hub. Each of the split sleeves 115, 116 has a respective latch 119 and hinge 120 to permit the sleeves to be split open to easily engage guide lines (not shown) which may extend from the upper ends guideposts (78 in FIGS. 7 to 9).

The rotating porch 70 provides greater installation tolerances, thereby reducing the cost of installation, and by returning the guideposts 78 on the rotating porch 70 to the vertical position, the tie-in to the pipeline 74 is greatly simplified. A sled with this feature would have installation tolerances increased from plus or minus 5 degrees to plus or minus 25 degrees, therefore making the installation of the pipeline sled and jumper installation less complicated and less expensive.

Thus, there is disclosed in the above description and drawings, methods and apparatus which fully and effectively accomplish the objects of this invention. However, it will be apparent that variations and modifications of the disclosed embodiments may be made without departing from the principles of the invention or the scope of the appended claims.

What is claimed is:

1. A pipeline connection assembly, which comprises:
   a) a connection hub adapted for mounting to a fluid containing structure; and
   b) a landing platform adapted for receiving a connection jumper, the landing platform being rotatably mounted with respect to the connection hub for adjustment of inclination of the landing platform.

2. The pipeline connection assembly of claim 1, further including at least one guidepost mounted to the landing platform for guiding the connection jumper into alignment with the connection hub.

3. The pipeline connection assembly of claim 1, wherein the connection hub is a rotary or swivel connection hub that makes a sealed connection with the connection jumper upon mating of the connection jumper with the connection hub.

4. The pipeline connection assembly of claim 1, wherein the landing platform is rotatably mounted to the connection hub.

5. The pipeline connection assembly of claim 4, further including a brace secured to the landing platform and at least partially entrained within a circular groove in the connection hub for mounting the landing platform to the connection hub.

6. The pipeline connection assembly of claim 1, further including a rotational adjustment mechanism for rotating the landing platform about the connection hub for adjustment of inclination of the landing platform.

7. The pipeline connection assembly of claim 6, wherein the rotational adjustment mechanism includes at least one arcuate rack mounted to the platform, and a pinion engaging the rack and journaled to a frame mounted to the connection hub.

8. The pipeline connection assembly of claim 7, wherein the pinion is connected to a torque bucket adapted for receiving a torque tool of a subsea remotely operated vehicle for rotation of the pinion by the remotely operated vehicle.

9. The pipeline connection assembly of claim 1, further including a locking mechanism for preventing rotation of the landing platform about the connection hub after an adjustment has been made to the inclination of the landing platform.

10. The pipeline connection assembly of claim 1, further including an inclinometer mounted to the landing platform.

11. A connection assembly for use in subsea pipeline connections, which comprises:
    a) a rotary or swivel pipeline connection hub adapted for mounting to an end portion of a generally horizontal pipeline section;
    b) a landing platform adapted for receiving a connection jumper for sealing engagement with the connection hub, the landing platform being rotatably mounted to the connection hub for adjustment of inclination of the landing platform; and
    c) a rotational adjustment mechanism for rotating the landing platform with respect to the connection hub.

12. The connection assembly as claimed in claim 11, further including at least one guidepost extending upwardly from the landing platform for aligning the connection jumper with the connection hub and pulling in the connection jumper into mating relationship with the connection hub once the connection jumper rests upon the landing platform.

13. The connection assembly of claim 11, wherein the adjustment mechanism includes at least one arcuate rack mounted to the landing platform and at least one pinion engaging the rack, the pinion being journaled to a frame mounted to the connection hub.

14. The connection assembly of claim 11, further including a locking mechanism for preventing rotation of the landing platform about the connection hub once an adjustment is made to the inclination of the landing platform.

15. The connection assembly of claim 11, further including an inclinometer mounted to the landing platform.

16. In a subsea pipeline system, a mid-line connection assembly which comprises:
    a) a pipeline having a tributary connection branch;
    b) a rotary or swivel connection hub mounted to the tributary connection branch;
    c) a landing platform having at least one guidepost, the landing platform being rotatably mounted to the connection hub; and
    d) a rotational adjustment mechanism for rotating the landing platform about the connection hub to adjust inclination of the landing platform.

17. The mid-line connection assembly of claim 16, further comprising at least one rack and at least one pinion, said at least one rack being attached to the landing platform, and said at least one pinion engaging the rack and being rotatably mounted on a rigid support structure.

18. The mid-line connection assembly of claim 16, further comprising a locking mechanism for preventing rotation of the landing platform about the connection hub after an adjustment has been made to the inclination of the landing platform.

19. A method for connecting a pipeline jumper to a connection assembly, the connection assembly having a connection hub and a landing platform rotatably mounted with respect to the connection hub for adjustment of inclination of the platform, the landing platform being adapted for receiving the pipeline jumper, the connection hub being mounted to an end portion of a subsea pipeline, said method comprising:

a) rotating the landing platform to a substantially horizontal inclination;

b) landing the pipeline jumper on the landing platform; and c) mating the pipeline jumper to the connection hub.

20. The method as recited in claim 19, which includes locking the platform into the substantially horizontal inclination after rotating the landing platform to the substantially horizontal inclination, and before landing the pipeline jumper on the landing platform.

21. A method for connecting a pipeline jumper to a subsea connection assembly, the subsea connection assembly having a rotary or swivel connection hub and a landing platform mounted for rotation with respect to the connection hub for adjustment of inclination of the landing platform, the landing platform having at least one guidepost protruding upwardly from the landing platform, said method comprising:

a) rotating the landing platform to a substantially horizontal inclination;

b) landing the pipeline jumper on said at least one guidepost on the landing platform; and c) mating the pipeline jumper to the connection hub.

22. The method as recited in claim 21, which further includes locking the landing platform in the substantially horizontal inclination after rotating the landing platform to the substantially horizontal inclination, and before landing the pipeline jumper on said at least one guidepost protruding upwardly from the landing platform.

23. The method as recited in claim 21, which further includes applying a tension force between the guidepost and the connection jumper to pull the connection jumper into mating engagement with the connection hub.

* * * * *